3,000,963
PROCESS FOR REFINING CRUDE POLYMERS AND ADDUCTS OF PROPYLENE OXIDE
George P. Speranza, Austin, Tex., assignor to Jefferson Chemical Company, Inc., Houston, Tex., a corporation of Delaware
No Drawing. Filed May 11, 1959, Ser. No. 812,126
7 Claims. (Cl. 260—615)

This invention relates to addition products of propylene oxide and, more particularly, to an improved method for refining the crude high molecular weight polymers and adducts formed from the reaction of propylene oxide with a hydroxyl-containing compound.

The polymers of propylene oxide, i.e. polyoxypropylene glycols, are perhaps the best known addition products. These materials have been widely employed as lubricants, emulsifiers, plasticizers, and solvents. They have also been employed as chemical intermediates, such as in the production of polyurethanes. In general, the polymers of propylene oxide may be represented by the formula $$HO(CH_3.C_2H_3O)_nH$$

in which $n$ has a value from about 4 up to about 400. The adducts of propylene oxide having many properties and uses similar to those of the polymers may be represented by the formula $$R-[O(CH_3.C_2H_3O)_nH]_x$$

in which R represents an alkyl or hydroxyalkyl radical, $x$ equals a number from 1 to 3 and $n$ has a value as set forth above.

Crude propylene oxide polymers and adducts are prepared by reacting propylene oxide with a suitable initiator under oxyalkylation conditions. The initiator or charge material in such a reaction either for polymer or adduct formation is, in general, a hydroxyl-containing aliphatic organic compound composed entirely of the atoms, carbon, hydrogen and oxygen and selected from the group consisting of monohydric alcohols, glycols and polyglycols, and triols. Polymers of propylene oxide, commonly known as propylene glycols, may for example, be prepared by reacting propylene oxide with propylene glycol, dipropylene glycol or water. Adducts may be prepared in a similar fashion by reacting propylene oxide with a hydroxyl-containing compound such as ethylene glycol, diethylene glycol, glycerol, trimethylol propane, trihydroxy hexane and an aliphatic alcohol, such as methanol, ethanol, butanol, 2-ethylhexanol and the like.

For purposes of clearly defining the foregoing propylene oxide polymers and adducts, they are hereinafter referred to in the specification and claims as "polypropylene glycols and adducts thereof" having the formula $$R[O(CH_3.C_2H_3O)_nH]_x$$

wherein $x$ is a whole number from 1 to 3, $n$ has a value from about 4 to 400, and R is selected from the group consisting of hydrogen and an aliphatic organic residue resulting from the removal of 1 to 3 hydroxyl groups corresponding to the value of $x$ from any aliphatic organic hydroxyl-containing compound consisting of carbon, hydrogen and oxygen selected from the group consisting of monohydric alcohols, glycols, polyglycols and triols.

In general, adduct or polymer formation with propylene oxide is effected by contacting the initiator with propylene oxide at an elevated temperature in the range of 80°–150° C. under a moderately elevated pressure, and in the presence of an alkaline-reacting material or catalyst. Alkaline bodies suitable for effecting this reaction include sodium and potassium hydroxide and the corresponding hydrides and alkoxides. On completion of the oxyalkylation reaction, the crude reaction product containing the alkaline-reacting material is normally treated with an inorganic acid or acid-forming material to neutralize the alkaline bodies remaining in the reaction product after which it is filtered to produce a finished product.

Polypropylene glycols must conform to exacting product specifications to be commercially acceptable. Among the many factors considered in determining the quality of such a product is the total ash content which generally must not exceed 0.005%. In addition, the product must be clear, i.e. free from haze, substantially anhydrous, have an acid value of less than 0.2 meq./gram.

Manufacturing procedures designed to refine crude polypropylene glycols and produce a product having the necessary properties generally call for treatment of the alkaline product with an acid or acid-forming material, such as sulfuric acid, phosphoric acid, acetic acid, and carbon dioxide. The particular acids noted have been employed for reasons of economy and because for the most part the salts formed during neutralization were of a filterable nature.

While the foregoing general refining method may be operative under certain conditions, nevertheless, many problems have been encountered during its employment. For example, with the viscous polypropylene glycol polymers, it has been difficult to determine the exact amount of acid required for neutralization. As a result of this, the amount of acid employed in the neutralization step has often been in error. When insufficient acid was employed, the finished product being alkaline was unstable and rapidly deteriorated in color. On the other hand when too much acid was employed, the finished product in an acid condition would be adversely affected in its chemical and physical properties. If water washing was resorted to to improve the quality of the product, additional refining steps were required to produce a product having the necessary anhydrous characteristics. A further difficulty commonly experienced when inorganic acids were employed in the process was the fact that the clear finished product often would develop a hazy appearance on standing despite the fact that it had been carefully refined.

An improved refining method has now been discovered which obviates the difficulties herebefore experienced to produce propylene oxide polymers and adducts of highly satisfactory commercial quality. This method is particularly valuable for refining polymers and adducts having average molecular weights in excess of about 200.

In accordance with this invention, a crude propylene oxide polymer or adduct prepared according to the general method described above and in an alkaline condition is admixed with a substantial excess of a solid organic acid. The so-formed mixture is intimately admixed until substantially all of the alkaline catalyst has reacted with the acid to form an insoluble salt reaction product. The treated propylene oxide product at this point is characterized by having in suspension both the insoluble salts formed during neutralization and the unreacted excess acid in an insoluble form. The treated product is then filtered to remove all of the insoluble components thereby producing a refined polypropylene glycol.

This process is operative for the intended purpose when conducted with a particular class of solid organic acids. These acids besides being solid materials at normal temperature and at the temperatures employed in the process must also be substantially insoluble in the propylene oxide polymer or adduct and must form substantially insoluble salts with the alkali found in the crude product. Organic acids having these essential properties will be effective for neutralization and at the same time will produce during refining a mixture in which all of the foreign components, i.e. the salts of neutralization and the excess acid bodies, may be filtered off to leave a highly refined propylene oxide addition product. The products treated by this method will be substantially anhydrous, non-haze forming and stable. In addition they will have a negligible to nil ash content, and a low to nil acid content. Solid organic acids having the required properties and found suitable for this process include oxalic, oxydiacetic, oxalic acid dihydrate, benzoic, citric, succinic, fumaric, itaconic, phthalic, isophthalic and terephthalic acids.

A substantial excess of the solid organic acid is employed in this refining process. Such an excess may be in the range from about 10% up to 200% and above. This excess is calculated on the basis of the base and acid equivalents of the materials involved.

The foregoing process, while eminently suited for refining a broad range of propylene oxide polymers and adducts, nevertheless, leaves something to be desired with respect to the refining of higher molecular weight materials. It has been found, for example, that polypropylene glycols, having an average molecular weight in excess of about 2,000 and up to about 20,000 when treated as above and satisfactory in other respects, may not filter clear but, on the contrary, may retain a hazy appearance after filtering; the resulting product being defective in appearance. It has been discovered that this problem may be overcome by the additional step of heating the higher molecular weight products to a temperature in the range of 100°–150° C. prior to the addition of and neutralization with the solid organic acid. This results in haze-free high molecular weight products of commercial quality.

This refining process is normaly conducted at a temperature above about 50° C. Under certain circumstances, as pointed out above, material advantages are realized when the higher molecular weight products, are refined at a preferred temperautre in the range of 100°–150° C. The actual refining period exclusive of filtration may require a relatively short period of about 10 minutes or alternatively may take up to 2 to about 3 hours or longer depending primarily upon the viscosity and amount of crude product being treated.

In a typical example, crude polypropylene glycol was prepared by charging an initiator, such as propylene glycol, to an autoclave reaction vessel with a minor amount of sodium hydroxide as catalyst. The vessel was evacuated, flushed out with nitrogen and then charged with propylene oxide. The vessel was heated to a temperature of 100° C. to effect reaction while a constant pressure of 50 p.s.i. (pounds per square inch) was maintained through a connection with an external source of propylene oxide under pressure. After the desired amount of propylene oxide had reacted, the oxide feed was cut off and the reaction product digested for about 2 hours at about the reaction temperature. The contents were cooled and removed from the autoclave to be refined in the manner disclosed above.

The following examples illustrate the practice of this invention. In these examples, the acid number is equal to milliequivalents/gram×56.1. This was determined by dissolving a sample of about 30 grams in 50 ml. of neutral methanol and titration with 0.1 normal potassium hydroxide to a phenolphthalein end point.

Example I 305 grams of a crude polypropylene glycol having an average molecular weight of 1330 and containing 0.075 equivalent of base were admixed with 5.67 grams (0.045 mol, 20% excess) of oxalic acid dihydrate. The mixture was heated with stirring to 75° C. After 1 hour, three grams of Celite was added to the product and the product filtered. The filtered product was clear and almost water-white. In addition, it was ash-free, had a pH of 7.0 and an acid number of 0.053.

Example II 280 grams of a crude polypropylene glycol having an average molecular weight of 1770 and containing 0.045 equivalent of base were admixed with 4.17 grams of oxydiacetic acid (38% excess). This mixture was heated with stirring to 140° C. After 10 minutes digestion under these conditions, three grams of Celite was added, and the product filtered. The filtered product had a pH of 7.1, an acid number of 0.176 and an ash content of $9 \times 10^{-4}\%$.

Example III 430 grams of a crude polypropylene glycol having an average molecular weight of 1920 and containing 0.0565 equivalent of base were admixed with 6.42 grams (0.051 mol, 80% excess) oxalic acid dihydrate and heated to 105° C. After 15 minutes under these conditions, three grams of Hyflo Super Cel was added and the mixture filtered. The filtered product was clear and almost water-white in color. It was free of ash, had a pH of 6.4 and an acid number of 0.14.

Example IV 220 grams of a crude polypropylene glycol having an average molecular weight of 1155 and containing 0.0267 equivalent of base were admixed with 2.5 grams of citric acid monohydrate (0.0119 mol, 12½% excess) at 100° C. After 15 minutes nnder these conditions, two grams of Hyflo Super Cel was added and the mixture filtered. The product was free of ash, had a pH of 7.0 and acid number of 0.054.

Example V 305 grams of a crude polypropylene glycol having an average molecular weight of 1885 and containing 0.075 equivalent of base were admixed with 6.28 grams of oxydiacetic acid (25% excess) at a temperature of 100° C. After digestion for 1 hour under these conditions, the mixture was centrifuged, vacuum stripped and filtered with the aid of Celite. The product was clear, had a pH of 6.9, an acid number of 0.16 and an ash content of $9.8 \times 10^{-4}\%$.

Propylene oxide adducts of glycerol and trimethylol propane having average molecular weights in the range of 400–3000 have also been prepared. These adducts were neutralized with oxalic acid and filtered in the manner described in the foregoing examples. The resulting products were ash-free and had a low acid content.

For some specific applications, it is desirable to produce a product having a low amount of "unsaturates" in addition to the properties described above. In such cases, the unsaturates should not exceed 0.04 meq. per gram. This specification may be realized by subjecting the neutralized and filtered product obtained according to the foregoing examples to a vacuum stripping operation. Vacuum stripping is accomplished in a vessel provided with a stirrer and equipped to maintain the material being stripped at a temperature about 150° C. A vacuum of about 5 millimeters of mercury absolute is applied while a slight nitrogen bleed is passed through the heated and stirred material. The unsaturates are substantially reduced in small batches of material when a stripping period of 15 to 30 minutes is employed. In a typical example, a neutralized and filtered polypropylene glycol product of 2000 average molecular weight having an unsaturation value of 0.047 meq./gram was subjected to stripping as described above. After the stripping treatment, the product had an unsaturates value of 0.032 meq./gram.

Obviously many modifications and variations of the invention as hereinbefore set forth, may be made without departing from the spirit and scope thereof, and therefore only such limitations should be imposed as are indicated in the appended claims.

I claim:
1. A method for refining a crude alkaline reaction product selected from the group consisting of crude alkaline polypropylene glycols and adducts thereof consisting of carbon, hydrogen and oxygen as hereinbelow defined, which comprises adding a solid organic acid to said crude product, said acid being insoluble in said product and producing salts that are insoluble in said product in an amount 10% to about 200% in excess of the alkaline equivalent of said crude product to effect a reaction between said alkaline-reacting material and said acid and form said insoluble salts in said crude product, and filtering said reaction product to remove said insoluble salt and excess organic acid thereby leaving a substantially ash-free, stabilized polypropylene oxide addition product, said polypropylene glycols and adducts being represented by the formula:

$$R[O(CH_3 \cdot C_2H_3O)_nH]_x$$

in which $n$ has a value from 4 to about 400, $x$ is a whole number from 1 to 3 and R represents a member selected from the group consisting of hydrogen, alkyl and hydroxy alkyl radicals.

2. A process according to claim 1 in which said organic acid is selected from the group consisting of oxalic, oxydiacetic, benzoic, citric, succinic, fumaric, itaconic, phthalic, isophthalic and terephthalic acids.

3. A method for refining a crude alkaline polypropylene glycol represented by the formula:

$$HO(CH_3 \cdot C_2H_3O)_n$$

in which $n$ is 4 to about 400, which comprises adding a solid organic acid to said polypropylene glycol while maintaining said glycol at a temperature in the range of 50 to 150° C., said acid being substantially insoluble in said polypropylene glycol and producing salts that are insoluble in said product, in an amount ranging from about 10% up to about 200% in excess of the alkaline equivalent of said material to effect a reaction between said alkaline-reacting material and said acid and form an insoluble salt, and filtering said polypropylene glycol to remove said insoluble salt and unreacted organic acid thereby producing a substantially ash-free, stable polypropylene glycol product.

4. A process according to claim 3 in which said organic acid is selected from the group consisting of oxalic, oxydiacetic, benzoic, citric, succinic, fumaric, itaconic, phthalic, isophthalic and terephthalic acids.

5. A process for refining a crude alkaline polypropylene glycol having a molecular weight in the range from about 2000 up to about 20,000 obtained from the reaction of a hydroxyl-containing compound containing only carbon, hydrogen and oxygen, and selected from the group consisting of aliphatic glycols and polyglycols and monohydric alcohols with propylene oxide in the presence of an alkaline-reacting material, which comprises heating said polypropylene glycol to a temperature in the range from about 100° C. up to about 150° C., adding a solid organic acid to said polypropylene glycol, said acid being substantially insoluble in said polypropylene glycol, in an amount ranging from about 10% up to about 200% in excess of the alkaline equivalent of said glycol to effect a reaction between said alkaline-reacting material and said acid with the formation of an insoluble salt reaction product, and filtering said polypropylene glycol to remove said insoluble salt and unreacted organic acid thereby producing a substantially ash-free, stabilized polypropylene glycol product, said acid being selected from the group consisting of oxalic, oxydiacetic, benzoic, citric, succinic, fumaric, itaconic, phthalic, isophthalic and terephthalic acids.

6. A process according to claim 5 in which said organic acid is oxalic acid.

7. A process according to claim 5 in which said filtered polypropylene glycol product is stripped while bleeding nitrogen therethrough at a subatmospheric pressure of about 5 mm. Hg absolute and at a temperature of about 150° C. to substantially reduce the unsaturates value of said product.

No references cited.